US007127444B2

(12) United States Patent  
Peake, Jr. et al.

(10) Patent No.: US 7,127,444 B2  
(45) Date of Patent: Oct. 24, 2006

(54) SYSTEM FOR ACTIVE REPORTS WITH DRILL DOWN CAPABILITY USING MEMORY MAPPING OF HTML FILES WITH EMBEDDED DATA

(75) Inventors: William Peake, Jr., Manassas, VA (US); Sripriya Narayanan, Reston, VA (US)

(73) Assignee: W. Quinn, Inc., Cupertino, CA (US)

( * ) Notice: Subject to any disclaimer, the term of this patent is extended or adjusted under 35 U.S.C. 154(b) by 535 days.

(21) Appl. No.: 10/133,338

(22) Filed: Apr. 29, 2002

(65) Prior Publication Data

US 2002/0174140 A1 Nov. 21, 2002

Related U.S. Application Data

(60) Provisional application No. 60/287,147, filed on Apr. 27, 2001.

(51) Int. Cl.
*G06F 7/00* (2006.01)
*G06F 15/00* (2006.01)

(52) U.S. Cl. .................. 707/1; 707/2; 707/10; 715/500; 715/503; 715/792

(58) Field of Classification Search .............. 707/1–10, 707/102, 104.1; 709/203, 227; 715/503, 715/513, 500
See application file for complete search history.

(56) References Cited

U.S. PATENT DOCUMENTS

| | | | | |
|---|---|---|---|---|
| 5,502,836 | A | * | 3/1996 | Hale et al. ................... 711/170 |
| 5,758,345 | A | * | 5/1998 | Wang .......................... 707/100 |
| 5,848,410 | A | * | 12/1998 | Walls et al. ................... 707/4 |
| 6,271,845 | B1 | * | 8/2001 | Richardson .................. 715/764 |
| 6,351,845 | B1 | | 2/2002 | Hinker et al. |
| 6,356,915 | B1 | * | 3/2002 | Chtchetkine et al. ........ 707/200 |
| 6,393,422 | B1 | * | 5/2002 | Wone ........................... 707/10 |
| 6,516,324 | B1 | * | 2/2003 | Jones et al. .............. 707/104.1 |
| 6,539,370 | B1 | * | 3/2003 | Chang et al. .................. 707/2 |
| 6,569,205 | B1 | * | 5/2003 | Poggi .......................... 715/500 |
| 6,594,662 | B1 | * | 7/2003 | Sieffert et al. ................ 707/10 |

(Continued)

OTHER PUBLICATIONS

"Product Review: From Chaos to Control: StorageCeNTral 4.1", Northrup, *Microsoft Certified Professional Magazine Online*, Chatsworth, CA, Oct. 2000 (4 pages).

(Continued)

*Primary Examiner*—Jean M. Corrielus
*Assistant Examiner*—Anh Ly
(74) *Attorney, Agent, or Firm*—Meyertons Hood Kivlin Kowert & Goetzel, P.C.; B. Noël Kivlin (57) ABSTRACT

A system and method for obtaining information on a large number of files, and to view and take action on those files. The present invention compiles a report on a file system in HTML format that is displayed by a browser. The report allows users to manage their files, or portions of their files, directly from the report, relieving system administrators of this burden. The method comprises: requesting Active Reports to be run; generating a CSV formatted copy of the files in the storage mechanism; converting the CSV formatted copy of the files to an HTML formatted copy of the files; reading the HTML formatted copy of the files so that the user can view the files; loading the file data by mapping the HTML formatted copy of the files to memory into a spreadsheet-like grid; and managing the display of the report and user report requests.

24 Claims, 11 Drawing Sheets

U.S. PATENT DOCUMENTS

| | | | |
|---|---|---|---|
| 6,615,258 B1* | 9/2003 | Barry et al. | 709/223 |
| 6,675,161 B1* | 1/2004 | Suchter | 707/5 |
| 6,757,689 B1* | 6/2004 | Battas et al. | 707/101 |
| 6,768,994 B1* | 7/2004 | Howard et al. | 707/10 |
| 2001/0034679 A1* | 10/2001 | Wrigley | 707/1 |
| 2002/0049726 A1* | 4/2002 | Cork et al. | 707/1 |
| 2002/0140699 A1* | 10/2002 | Miyadai | 345/440 |
| 2002/0156552 A1* | 10/2002 | Whiting | 700/300 |
| 2004/0039663 A1* | 2/2004 | Kernz | 705/27 |

OTHER PUBLICATIONS

"HighGround SRM Enterprise Edition 4.0", *System News*, Coral Springs, FL, vol. 38 Issue 3, Apr. 16, 2001 (3 pages).

* cited by examiner

205 — USER REQUESTS ACTIVE REPORTS TO BE RUN

210 — SCANNING APPLICATION GENERATES CSV COPY OF FILES

215 — ACTIVE REPORTS CONVERTS CSV COPY OF FILES TO HTML

220 — BROWSER READS HTML COPY

221 — ACTIVE REPORTS INSTALLED ON BROWSER MACHINE?

222 — NO → BROWSER INSTALLS ACTIVE REPORTS FROM WEB SITE

225 — YES → ACTIVE REPORTS MAPS HTML COPY TO MEMORY

230 — ACTIVE REPORTS MANAGES DISPLAY OF REPORT AND USER REPORT REQUESTS

SYSTEM FOR ACTIVE REPORTS WITH DRILL DOWN CAPABILITY USING MEMORY MAPPING OF HTML FILES WITH EMBEDDED DATA

This application claims priority from U.S. Provisional Application Ser. No. 60/287,147, filed Apr. 27, 2001. The entirety of that provisional application is incorporated herein by reference.

NOTICE OF COPYRIGHTED MATERIAL IN DISCLOSURE

A portion of the disclosure of this patent document may contain material that is subject to copyright protection. The copyright owner has no objection to the facsimile reproduction by anyone of the patent document or the patent disclosure, as it appears in the U.S. Patent and Trademark Office patent file or records, but otherwise reserves all copyright rights whatsoever.

BACKGROUND OF THE INVENTION

1. Field of the Invention

The present invention relates generally to generation and distribution of computer system reports, and specifically to reports of storage space usage where the report's display content is controlled by the recipient based on data imbedded in the report.

2. Related Art

Storage CeNTral 4.0 provides HyperText Markup Language (HTML) Reports, limited to a 2000 file display, with a lengthy load time for over 1000 files. Storage CeNTral 4.1 provides HTML Reports, limited to a 5000 file display, with a lengthy load time for over 1000 files. Files can be managed on the reports, but there is no drill down.

Storage CeNTral 5.0 provides HTML Reports with no limit to file display, and drill down capability.

Highground SRM provides HTML Reports.

Quicken provides HTML reports with drill down capability.

3. Background of the Technology

Users often require information on their operating system. For example, users need to know how much storage space they have available on a system, or how they can open up more storage space. Reports are run on systems to generate this information. Due to the complexity of the programs that run the reports, users often need system administrators to both download and run these programs. Once the reports are obtained, the reports can usually only be used to view information on the files stored on the operating system, and cannot be used by the user to directly access the files. This is partially due to the large size of data that must be downloaded to access the files.

There is thus a need in the current art for a reporting application that is easy to install. In addition, there is a need to be able to access very large numbers of files while using the reporting application. Furthermore, there is a need to take action on the very large number of files the user is accessing, and see this action reflected immediately in the report.

SUMMARY OF THE INVENTION

The present invention addresses the limitations of the prior art by providing a reporting application that is: self-contained and Web-based; allows a user to access very large number of files; and allows a user to take action on the files and see that action reflected in the report.

The present invention, referred to in one embodiment as Active Reports, allows a user to obtain information on a large number of files, and to view and take action on those files. The present invention compiles a report on a file system (e.g., Windows NT/NTFS) in HTML format that is displayed by a browser on a machine. In a preferred embodiment of the present invention, the machine is an Intel processor based machine running Windows 98, Windows NT 4, Windows 2000, or Windows XP, and the browser is Microsoft Internet Explorer 5.0 or above. The report can use any file system output (e.g., an MFT Fast Scan). The report comprises grids and graphs, and both can be drilled down into supporting detail. In one embodiment, the report is displayed in a spreadsheet-like grid, with optional graphs displayed to summarize information in the grid. The report allows users to manage their files, or portions of their files, directly from the report, relieving system administrators of this burden. Thus, users can, among other actions, open, edit, explore, run, select, clear, find, delete, copy or move files.

Active Reports is self-contained and Web-based, and is thus very easy to install and use. A Web server is not required, and the reporting application can be emailed. Alternatively, a user can access a Web site and use the reporting application by clicking on an icon. Once the user clicks on the icon, the program will check to see if the reporting application is installed. If it is not yet installed, it is automatically installed at this time.

Active Reports also allows a user to access very large numbers of files (e.g., the number of files on the entire system) by managing a grid using memory mapping. Rather than loading the whole grid, only that part of the grid which the user views while scrolling is dynamically loaded. This is important because the user has access to the entire system of files without waiting for a lengthy period of time for the files to download.

Furthermore, Active Reports allows a user to take action on a very large number of files. The user may access the files, change the files, and see the report modified immediately, as opposed to being required to run the report again to get the updated information.

The system of the present invention may include one or more of the following: a distributed computer network; workstations; browsers; a storage mechanism; a scan application; and a reporting application, referred to in one embodiment as Active Reports.

The method of the present invention may include one or more of the following: requesting Active Reports to be run; generating a CSV formatted copy of the files in the storage mechanism; converting the CSV formatted copy of the files to an HTML formatted copy of the files; reading the HTML formatted copy of the files so that the user can view the files; loading the file data by mapping the HTML formatted copy of the files to memory into a spreadsheet-like grid; and managing the display of the report and user report requests. In an alternative embodiment, the present invention can be set up to automatically generate reports.

The objects of the present invention may include one or more of the following: 1) Providing reports on a file system in HTML format that can be displayed by a browser on any machine; 2) Providing direct navigation from a summary to supporting detail; 3) Allowing users to directly manage their files with, thus relieving system administration of this burden; 4) Providing a format for reporting in HTML format a file system summary and detail information that can be displayed and manipulated from a browser.

While the invention has been described in terms of a few preferred embodiments, those skilled in the art will recognize that the invention can be practiced with modification within the spirit and scope of the appended claims.

BRIEF DESCRIPTION OF THE DRAWINGS

The foregoing and other objects, aspects and advantages will be better understood from the following detailed description of a preferred embodiment of the invention with reference to the drawings, in which:

FIGS. 4A and 4B, together comprising FIG. 4, are exemplary screen shots illustrating drill down detail on a particular disk drive.

DESCRIPTION OF THE INVENTION

The present invention, referred to as Active Reports in one embodiment, compiles a report on a file system (e.g., Windows NT/NTFS) in HTML format that is displayed by a browser on any machine. The report can use any file system output (e.g., an MFT Fast Scan). The report may comprise grids and graphs, and both can be drilled down into supporting detail. In one embodiment, the report is displayed in a spreadsheet-like grid, with an optional graph displayed to summarize information in the grid. The report allows users to directly manage their files, relieving system administrators of this burden.

The present invention memory maps a large number of HTML files into the spreadsheet-like grid. The grid used to manage display of the data portion of the HTML files. The HTML files can be managed directly from the report, and the files, or portions of the files, can be opened, edited, explored, run, selected, cleared, found, deleted, copied, moved, etc.

For example, in one embodiment, if a user wants to increase some of the user's storage space, rather than contacting the system administrator, the user runs a report that shows the files stored on the user's computer. The user initiates the Active Reports application. The user then sees a screen that breaks down the different drive names of the computer. If the user sees that drive L is 92% used, the user drills down for details on drive L. The details on drive L are broken up into many categories, one of which is a category on large files. The user drills down into the large files category, and sees a grid comprising the list of files in the large files category. The user then drills down and opens each of the files in the large files category to see what the file contains, and then deletes the file, if desired.

In an alternative embodiment, the present invention can be set up to automatically generate reports. For example, if a system is 85% full, the system can automatically run the present invention for all files that fit in the Files Not Used and Large Files categories. The present invention then displays these files to the user and ask the user if they should be deleted.

System Overview

Figure 1:
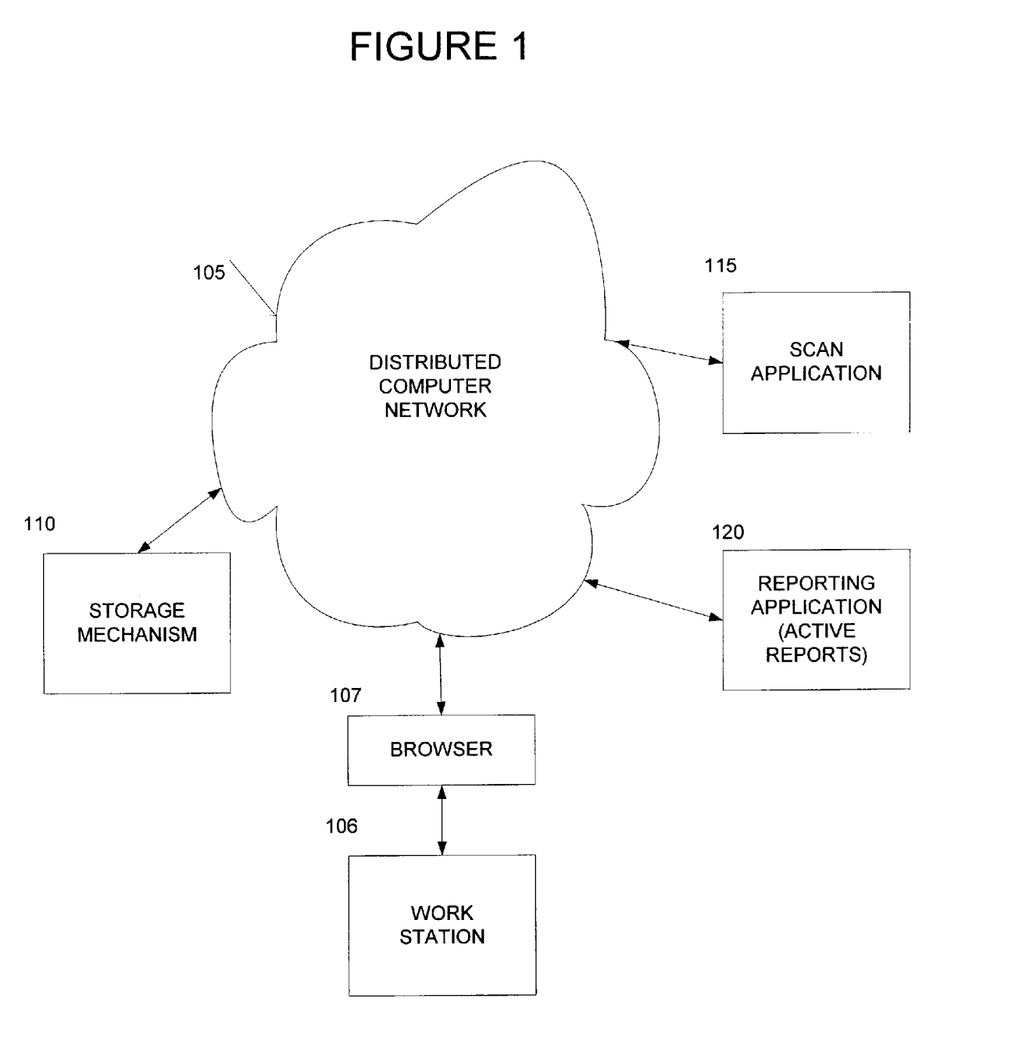
FIG. 1 illustrates the primary components of a representative operating environment for an exemplary embodiment of the present invention.

FIG. 1 illustrates the primary components of a representative operating environment for an exemplary embodiment of the present invention. An on-line environment 100 comprises: a distributed computer network 105; one or more workstations 106; one or more browsers 107; a storage mechanism 110; a scan application 115; and a reporting application 120.

The distributed computer network is a network such as the global Internet that facilitates communication between the workstation, the storage mechanism, the scan application, and the reporting application.

The workstations take input from the users, and allows users to view output from the reporting application.

The browsers are software on the workstations that let a user view HTML documents and access files and software related to those documents.

The storage mechanism stores data, and is accessed by the scan application and the reporting application. In one embodiment, the storage mechanism is a database, which is a file composed of records, each containing fields together with a set of operations for searching, sorting, recombining, and other functions.

The scan application scans the storage mechanism for the data. In one embodiment, the scan application can be an MFT Fast Scan Application Programming Interface (API), which is a set of routines used by an application to direct scanning.

The reporting application, referred to as an Active Report application in one embodiment, is an application that works on a browser to display file information. Active Reports allows a user to drill down to see detail about a file, take action on a file, or both. The reporting application accesses the scan application and the storage mechanism.

Method Overview

Figure 2:
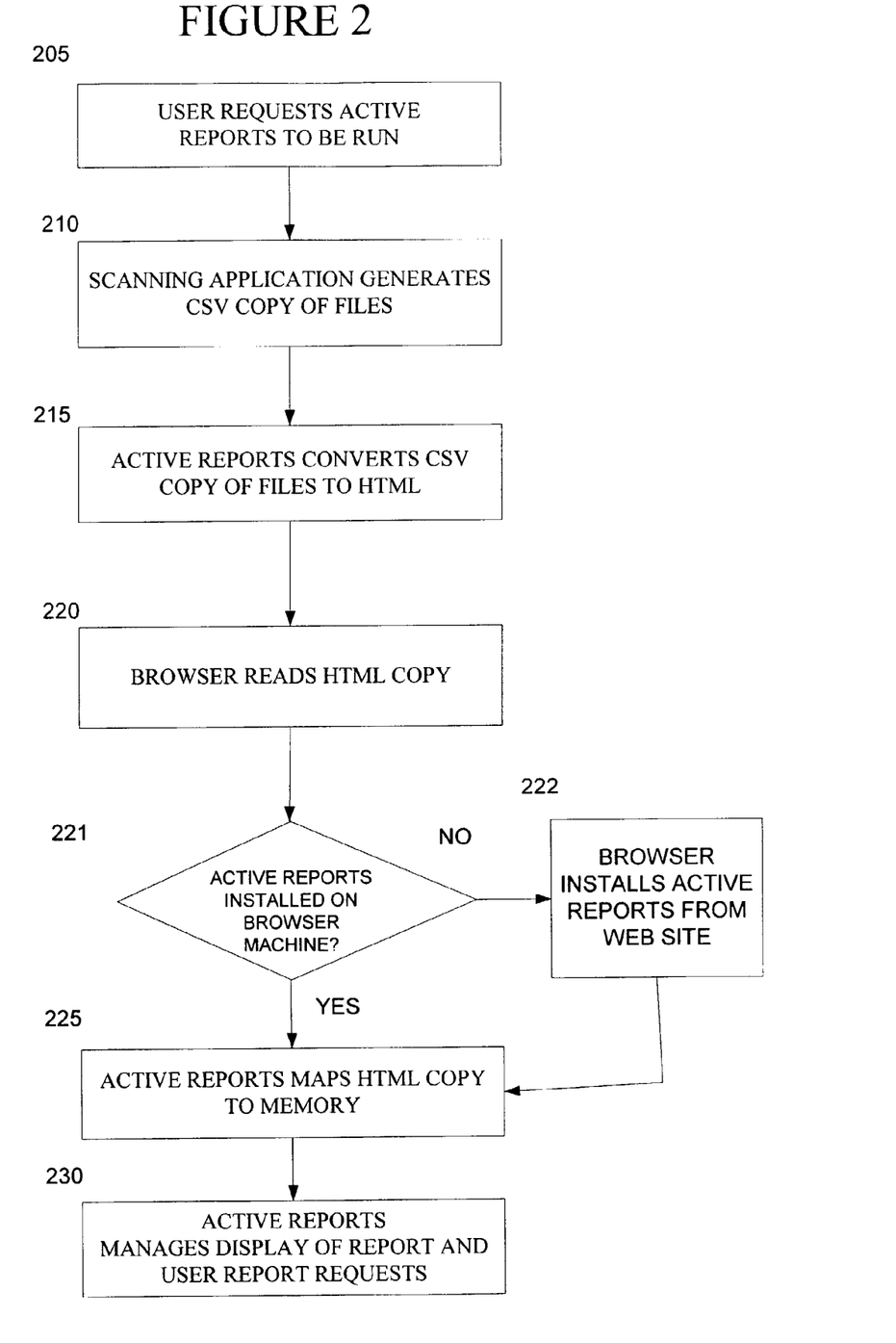
FIG. 2 illustrates a method overview of an exemplary embodiment of the present invention.

FIG. 2 is an overview of the method in an exemplary embodiment of the present invention.

In step 205, the user requests Active Reports to be run.

In step 210, the scanning application generates a Comma Separated Value (CSV) formatted copy of the files in the storage mechanism. Active Reports tells the scanning application to scan for all the files in the database. The scanning application scans for all the files, and passes a CSV formatted list of files to Active Reports.

In step 215, Active Reports converts the CSV formatted copy of the files in the storage mechanism to an HTML formatted copy of files.

In step 220, the browser reads the HTML formatted copy of files so that the user can view the list of files.

In step 221, it is determined whether Active Reports is installed on the browser machine. If No, the browser installs Active Reports from the Web site, as shown in step 222. If YES, the process moves to step 225.

In step 225, Active Reports loads the data by mapping the HTML formatted copy of files to memory. Active Reports reads through the entire copy of files and finds the character position (byte offset) at the start of every line. This character position corresponds to the start of a new file. Active Reports takes the character positions for the start of every file and builds an index of files that indicates where the file starts. Thus, for example, if there were 1632 files in the storage mechanism, Active Reports would indicate that file 1532 starts on character position 8,333,432 and file 1533 starts on character position 8,334,221.

Figure 3:
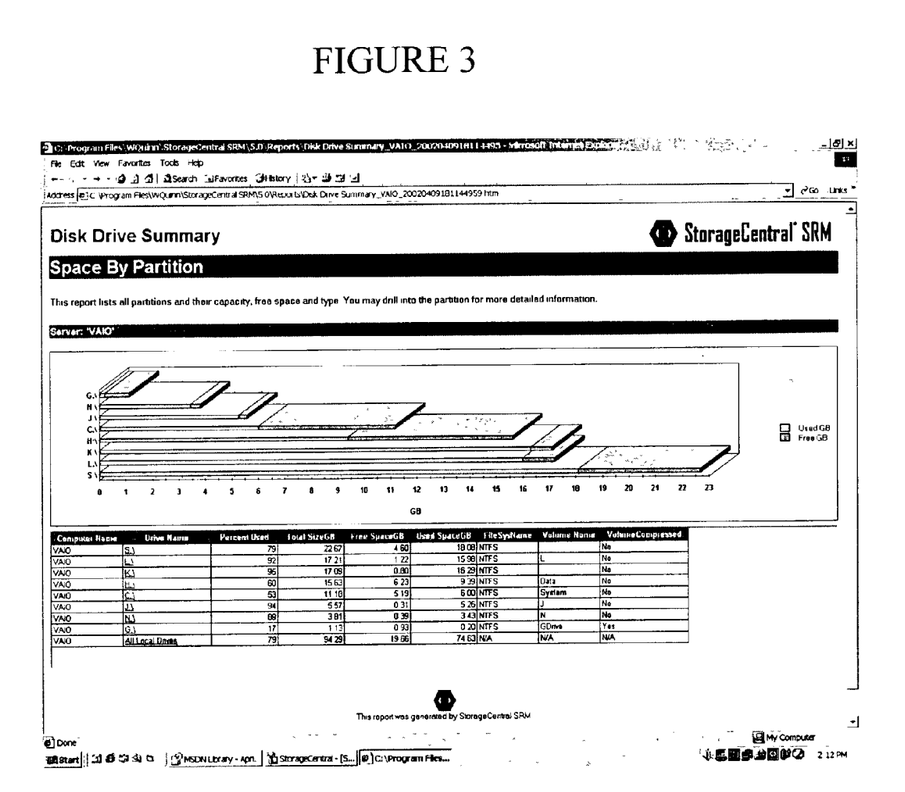
FIG. 3 is an exemplary screen shot illustrating a Disk Drive Summary.

In step 230, Active Reports manages the display of the report and user report requests. At this point, for example, the user views the report outlining a Disk Drive Summary, and has the ability to drill down into the report to learn more information about the files or to change the information about the files. FIG. 3 is an exemplary screen shot illustrating a Disk Drive Summary.

Each time the user drills down into the report, a new report request is processed. The Disk Drive Summary of FIG. 3 is an example of a report that the user may use to drill down. Thus, if the user chooses to drill down into the Disk Drive Summary, the user clicks on a disk drive in FIG. 3 to see additional details regarding that disk drive. The user views the different disk drives (e.g., S, L, K, H, C, J, N, G, and all Local Drives), and can choose to view more information on each of the disk drives. If the user chooses to view more information on the L drive, for example, the user will be taken to a screen shot similar to FIG. 4, which includes detailed information on disk drive L.

Figure 4A:
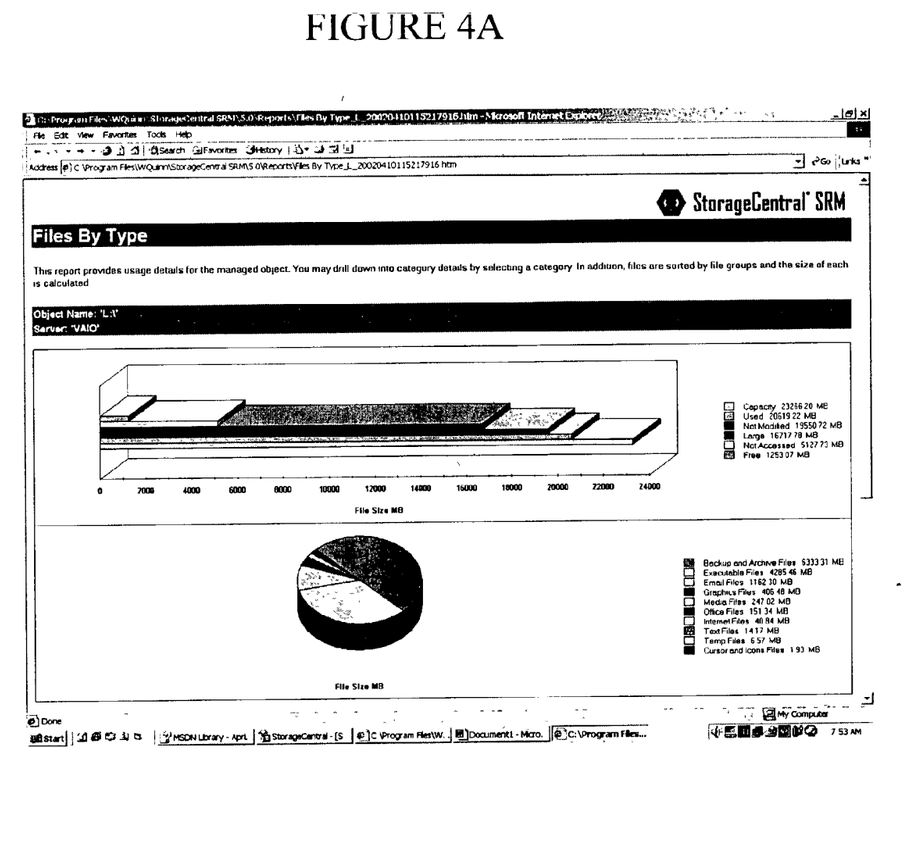
Figure 4B:
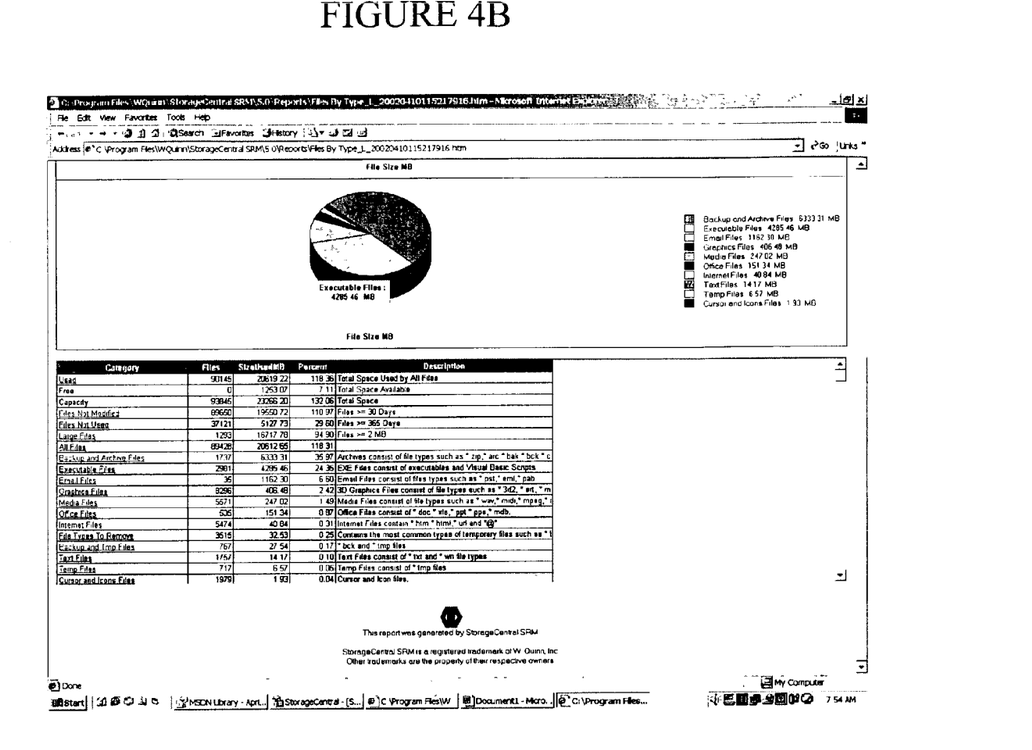

FIGS. 4A and 4B, together comprising FIG. 4, are exemplary screen shots illustrating drill down detail on a particular disk drive (e.g., Disk Drive L. FIG. 4A illustrates details of the report using a bar graph and a pie chart graph. The information on the bar graph includes Capacity for files (storage space capacity), Used files (files used), Not Modified files (files not changed in a certain amount of time), Large files (files bigger than a defined size), Not Accessed files (files not accessed in a certain amount of time), and Free files (files still available for storage). The pie chart includes information on Backup and Archived Files (files saved on the backup and archives systems), Email Files (files sent by email), Graphics Files (files including graphics), Media Files (files including audio and/or video information), Office Files (files including office information), Internet files (files including Internet information), Text Files (files comprising text information), Temp Files (temporary files) and Cursor and Icons Files (files that include cursors and icons). FIG. 4B illustrate the categories of the report. The categories comprise, but are not limited to: Used files, Free files, Capacity for files, Files Not Modified; Files Not Used; Large Files; All Files; Backup and Archive Files; Executable Files; Email Files; Graphics Files; Media Files; Office Files; Internet Files File Types to Remove; Backup and Temp Files; Text Files; Temp Files; Cursor and Icons Files. All of this information is related to only the L drive (the disk drive the user has "drilled down" into).

Figure 5:
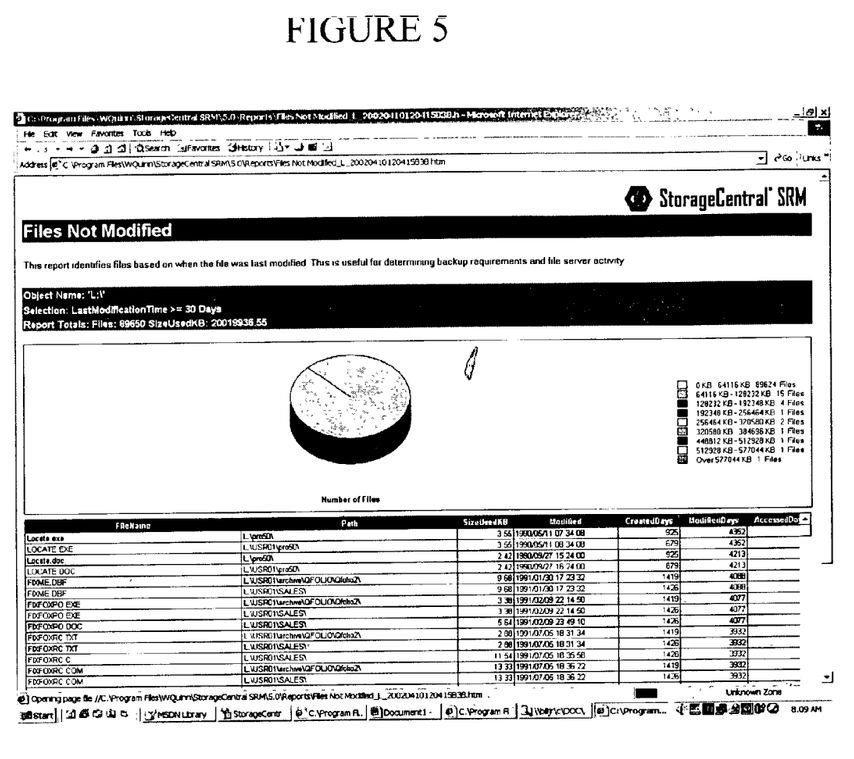
FIG. 5 is an exemplary screen shot illustrating drill down detail on the Files Not Modified category, which comprises a list of files in the Files Not Modified category.
Figure 6:
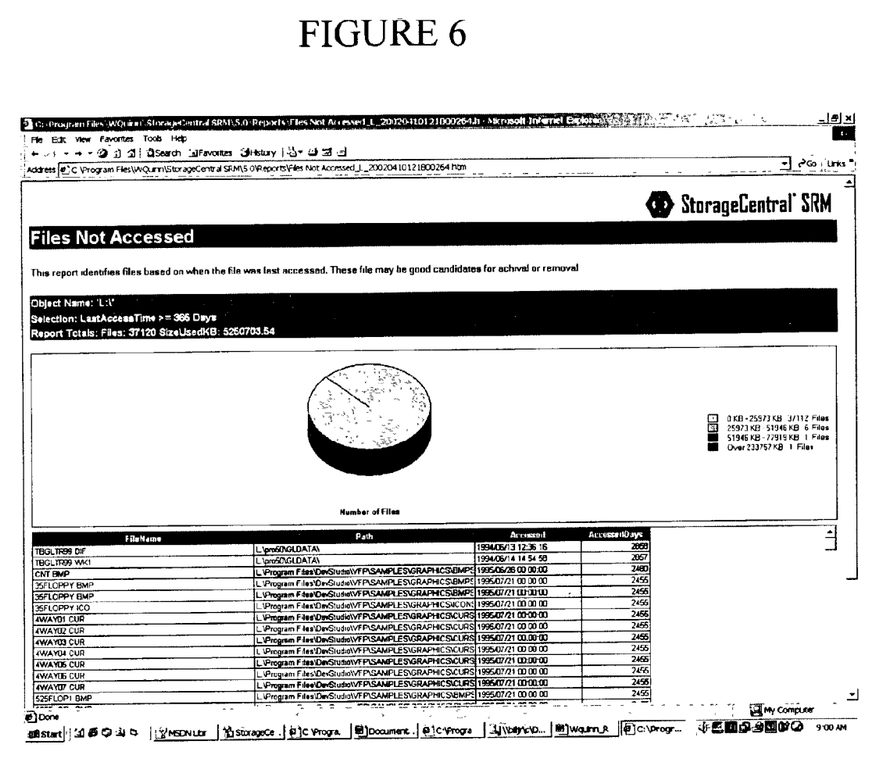
FIGS. 6–9 are exemplary screen shots illustrating drill down detail on, respectively, the Files Not Accessed category, the Files by Size category, the Backup and Archives Files category, and the File Types to Remove category.
Figure 7:
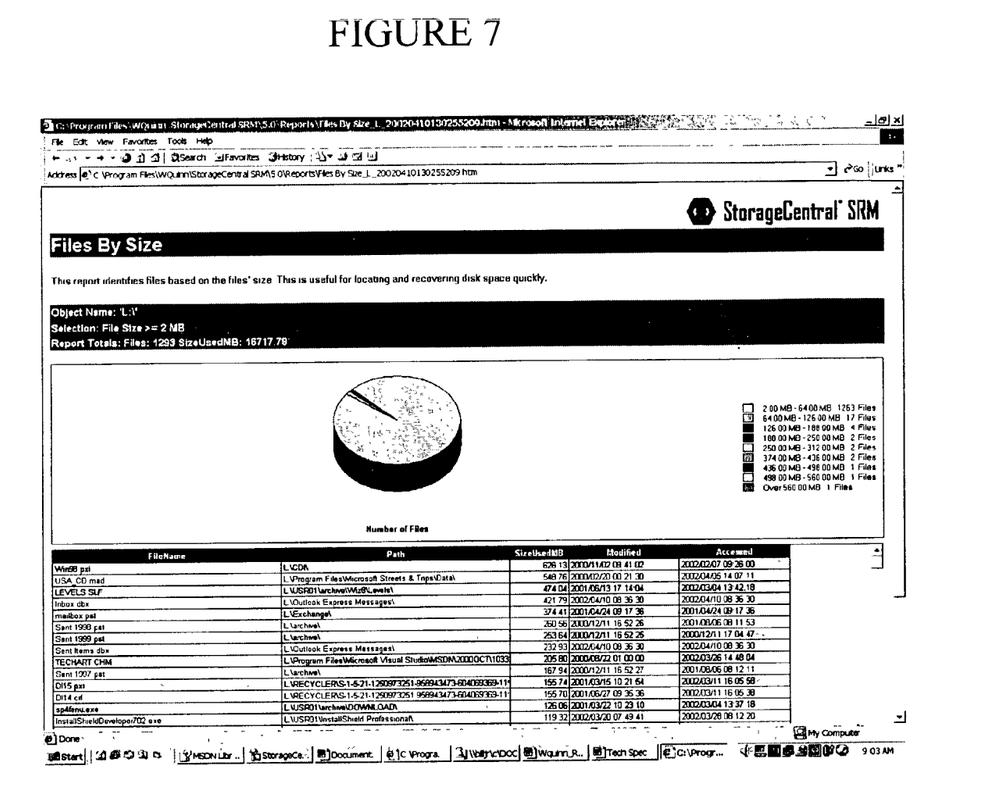
Figure 8:
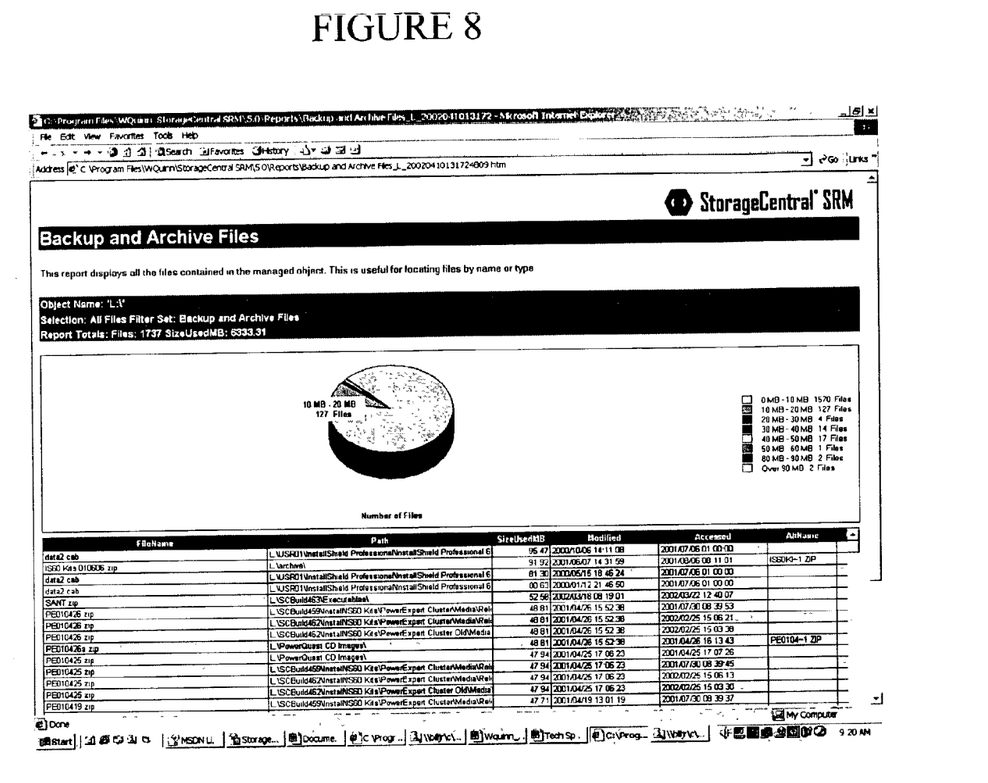

The user may then choose to drill down into a particular category of files. Thus, for example, the user can drill down into the category of Files Not Modified, and will be shown the list of files in that category. FIG. 5 is an exemplary screen shot illustrating drill down detail on the Files Not Modified category, which comprises a list of files in the Files Not Modified category. FIGS. 6–9 are exemplary screen shots illustrating drill down detail on, respectively, the Files Not Accessed category, the Files by Size category, the Backup and Archives Files category, and the File Types to Remove category. FIGS. 5–9 include information all from the same report on the L disk drive.

Originally only the first 10 files of the category are pulled and shown on the screen. These files are the only files loaded in memory.

The user can then scroll up or down within the category to see the other files. When the scroll is moved, Active Reports changes the files that are loaded in memory. Thus, for example, if the user moves the scroll down until files 1532–1542 are shown on the screen, Active Reports checks the index to find out the character position for files 1532–1542, and loads these characters in memory. Using our example above, Active Reports would find that file 1532 has the character position 8,333,432 and would obtain that line of data. Active Reports would look up the character position for the other rows 1533–1542 and obtain those lines of data as well. Active Reports does this as the user is scrolling. Because Active Reports obtains only a piece of the storage mechanism data, as opposed to obtaining the whole data, Active Reports is much faster and more efficient.

The importance of mapping the data, as opposed to downloading the data, should be noted. The present invention uses a virtual memory mapping system. Virtual memory mapping is when applications access memory through virtual addresses, which are mapped onto physical addresses. When data in a piece of memory is not being used, a virtual memory mapping manager takes that data and writes it out to a page file so the piece of memory is available to store other data. As the user scrolls down the grid, Active File looks up the index and maps (as opposed to downloads) the particular data for the grid the user views.

Figure 9:
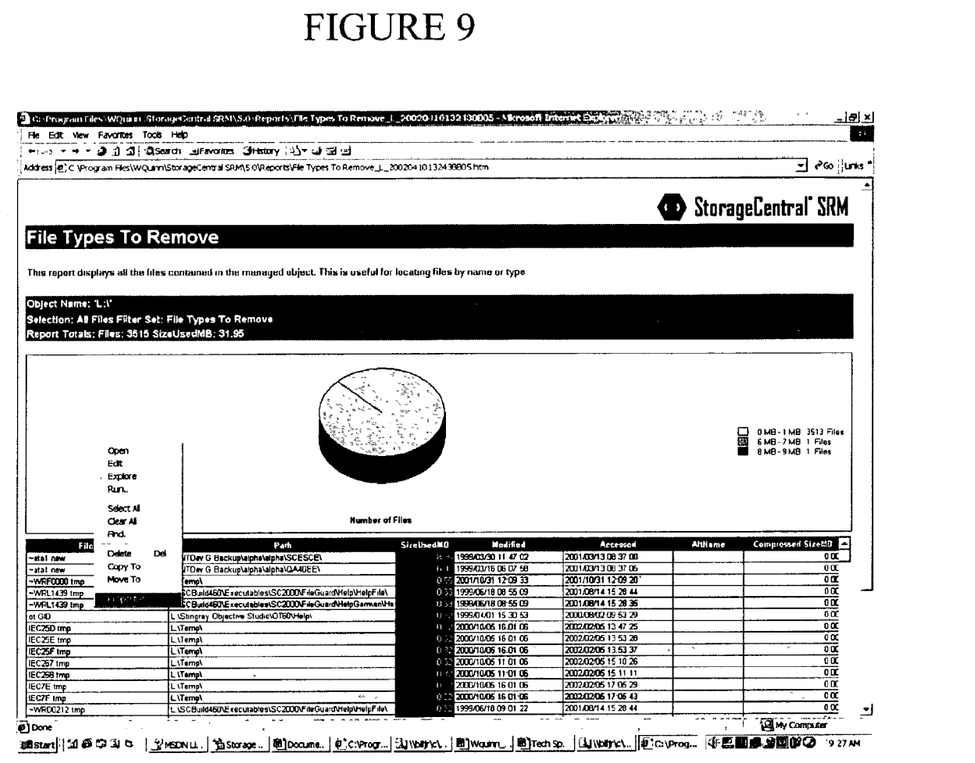
Figure 10:
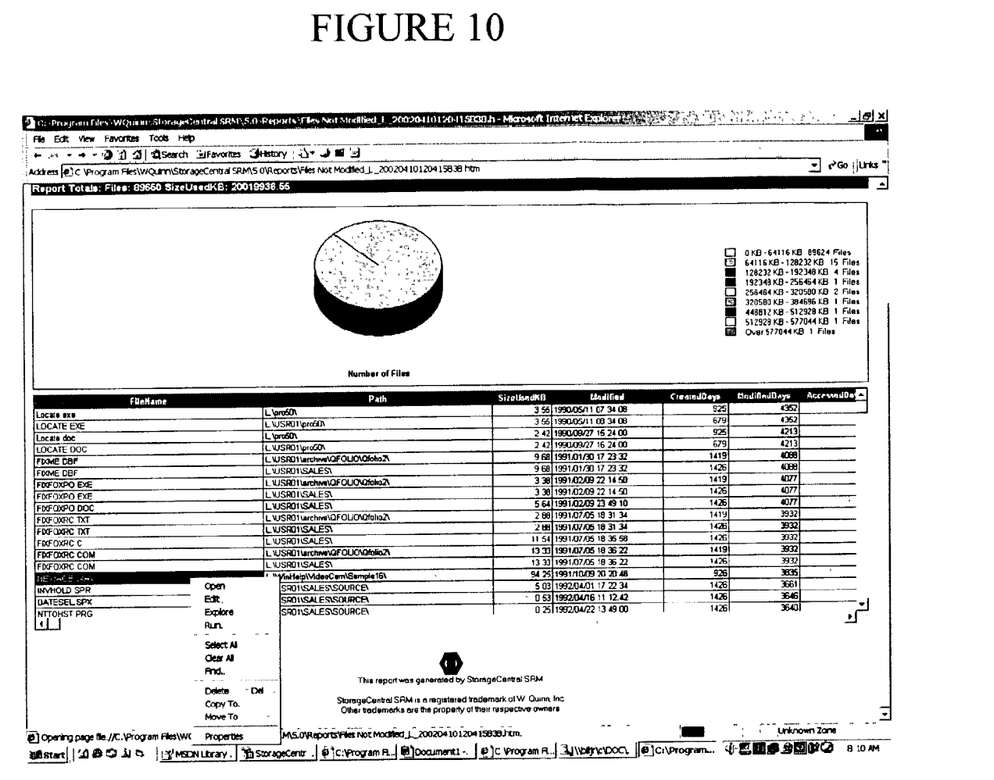
FIG. 10 is an additional exemplary screen shot of the present invention.

Once the user chooses a particular file, the user can take action on that file. FIG. 9 also illustrates some user options for taking action on the files in the File Types to Remove category. These options include Open, Edit, Explore, Run, Select All, Clear All, Find, Delete, Copy To, and Move To options that are typically used with file management. However, the present invention allows the user to immediately take action and see updated status on these files in the report, as opposed to closing the report and getting to the file through another means, or running another report to get updated status.

While the invention has been described in terms of a few preferred embodiments, those skilled in the art will recognize that the invention can be practiced with modification within the spirit and scope of the appended claims.

What is claimed is:

1. A computer-implemented method comprising:
generating a report comprising file system information for a plurality of files in a file system;
generating an index comprising a respective location within the report for each of the plurality of files;
using the index to load a first subset of the report into a memory of a computer system;
displaying the first subset of the report in a browser of the computer system;
receiving user input for report redisplay;
using the index to load a second subset of the report into the memory of the computer system in response to the receiving the user input for report redisplay;
displaying the second subset of the report in the browser of the computer system in response to the receiving the user input for report redisplay;
receiving user input for file system management into the browser; and
managing the files in the file system in response to the receiving the user input for file system management into the browser;
wherein the respective location within the report for each of the plurality of files comprises a byte offset within the report for the file system information for the respective file of the plurality of files.

2. The computer-implemented method of claim 1, further comprising:
drilling down into the file system information by drilling down into the report in the browser.

3. The computer-implemented method of claim 1, wherein the displaying the first subset of the report in the browser of the computer system comprises displaying a graph.

4. The computer-implemented method of claim 1, wherein the displaying the first subset of the report in the browser of the computer system comprises displaying a grid.

5. The computer-implemented method of claim 1, wherein the report is encoded in HTML.

6. The computer-implemented method of claim 1, wherein the managing the files in the file system comprises performing a file system operation on at least one of the files in the file system.

7. The computer-implemented method of claim 1, wherein the generating the report comprises automatically generating the report without user intervention.

8. The computer-implemented method of claim 1, wherein the browser comprises a web browser.

9. A system comprising:
a CPU; and
a memory coupled to the CPU, wherein the memory stores program instructions which are executable by the CPU to:
generate a report comprising file system information for a plurality of files in a file system;
generate an index comprising a respective location within the report for each of the plurality of files;
use the index to load a first subset of the report into the memory;
display the first subset of the report in a browser;
receive user input for report redisplay;
use the index to load a second subset of the report into the memory in response to receiving the user input for report redisplay;
display the second subset of the report in the browser in response to receiving the user input for report redisplay;
receive user input for file system management into the browser; and
manage the files in the file system in response to receiving the user input for file system management into the browser.
wherein the respective location within the report for each of the plurality of files comprises a byte offset within the report for the file system information for the respective file of the plurality of files.

10. The system of claim 9, wherein the program instructions are further executable by the CPU to:
drill down into the file system information by drilling down into the report in the browser.

11. The system of claim 9, wherein displaying the first subset of the report in the browser comprises displaying a graph.

12. The system of claim 9, wherein displaying the first subset of the report in the browser comprises displaying a grid.

13. The system of claim 9, wherein the report is encoded in HTML.

14. The system of claim 9, wherein managing the files in the file system comprises performing a file system operation on at least one of the files in the file system.

15. The system of claim 9, wherein generating the report comprises automatically generating the report without user intervention.

16. The system of claim 9, wherein the browser comprises a web browser.

17. A computer-readable storage medium storing program instructions, wherein the program instructions are computer-executable to implement:
generating a report comprising file system information for a plurality of files in a file System;
generating an index comprising a respective location within the report for each of the plurality of tiles;
using the index to load a first subset of the report into a memory of a computer system;
displaying the first subset of the report in a browser of the computer system;
receiving user input for report redisplay;
using the index to load a second subset of the report into the memory of the computer system in response to the receiving the user input for report redisplay;
displaying the second subset of the report in the browser of the computer system in response to the receiving the user input for report redisplay;
receiving user input for file system management into the browser; and
managing the files in the file system in response to the receiving the user input for file system management into the browser;
wherein the respective location within the report for each of the plurality of files comprises a byte offset within the report for the file system information for the respective file of the plurality of files.

18. The computer-readable storage medium of claim 17, wherein the program instructions are further computer-executable to implement:
drilling down into the file system information by drilling down into the report in the browser.

19. The computer-readable storage medium, of claim 17, wherein the displaying the first subset of the report in the browser of the computer system comprises displaying a graph.

20. The computer-readable storage medium of claim 17, wherein the displaying the first subset of the report in the browser of the computer system comprises displaying a grid.

21. The computer-readable storage medium of claim 17, wherein the report is encoded in HTML.

22. The computer-readable storage medium of claim 17, wherein the managing the files in the file system comprises performing a file system operation on at least one of the files in the file system.

23. The computer-readable storage medium of claim 17, wherein the generating the report comprises automatically generating the report without user intervention.

24. The computer-readable storage medium of claim 17, wherein the browser comprises a web browser.

* * * * *